(12) United States Patent
Kang et al.

(10) Patent No.: US 9,581,359 B2
(45) Date of Patent: Feb. 28, 2017

(54) REGENERATIVE AIR-CONDITIONING APPARATUS

(71) Applicant: LG ELECTRONICS INC., Seoul (KR)

(72) Inventors: Seungtak Kang, Seoul (KR); Sungoh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 14/354,447

(22) PCT Filed: Oct. 23, 2012

(86) PCT No.: PCT/KR2012/008720
§ 371 (c)(1),
(2) Date: Apr. 25, 2014

(87) PCT Pub. No.: WO2013/062287
PCT Pub. Date: May 2, 2013

(65) Prior Publication Data
US 2014/0298855 A1 Oct. 9, 2014

(30) Foreign Application Priority Data
Oct. 25, 2011 (KR) .......... 10-2011-0109225

(51) Int. Cl.
*F25B 1/00* (2006.01)
*F25B 13/00* (2006.01)

(52) U.S. Cl.
CPC .......... *F25B 1/005* (2013.01); *F25B 13/00* (2013.01); *F25B 2313/02741* (2013.01);
(Continued)

(58) Field of Classification Search
CPC .......... F25B 1/005; F25B 2339/042; F25B 2600/2501; F25B 2313/0271; F25B 2400/24
See application file for complete search history.

(56) References Cited

U.S. PATENT DOCUMENTS 5,381,671 A * 1/1995 Saito .............. F24F 3/065
62/430
5,724,827 A * 3/1998 Yamaguchi ..... F24F 5/0017
62/201

FOREIGN PATENT DOCUMENTS

CN 101413744 A 4/2009
JP 09-026182 A 1/1997
(Continued)

OTHER PUBLICATIONS

European Search Report issued in Application No. 12843686.2 dated Jul. 3, 2015.
(Continued)

*Primary Examiner* — Emmanuel Duke
(74) *Attorney, Agent, or Firm* — Ked & Associates LLP (57) ABSTRACT

A regenerative air-conditioning apparatus is provided. The regenerative air-conditioning apparatus includes an outdoor unit including a compressor and an outdoor heat exchanger, an indoor unit provided on a side of the outdoor unit, the indoor unit including an indoor heat exchanger, a refrigerant tube that connects the outdoor unit to the indoor unit to guide circulation of a refrigerant, a heat accumulation bath provided on at least one side of the outdoor unit or the indoor unit to store cool air or heat, a first tube that extends from the refrigerant tube to one side of the heat accumulation bath, a second tube that extends from the other side of the heat accumulation bath to the refrigerant tube, and a third
(Continued)

tube branched from the second tube, the third tube being connected to the refrigerant tube.

10 Claims, 6 Drawing Sheets

(52) U.S. Cl.
CPC ..... *F25B 2339/042* (2013.01); *F25B 2400/24* (2013.01); *F25B 2600/2501* (2013.01)

(56) References Cited

FOREIGN PATENT DOCUMENTS

| | | | |
|---|---|---|---|
| JP | 2000-127752 A | | 5/2000 |
| JP | 2001-012819 A | | 1/2001 |
| JP | 2005-042943 A | | 2/2005 |
| JP | 2006-029637 A | | 2/2006 |
| JP | 2006029637 A | * | 2/2006 |
| KR | 10-2010-0059170 A | | 6/2010 |
| WO | WO 2007/024063 A1 | | 3/2007 |

OTHER PUBLICATIONS

International Search Report and Written Opinion dated Mar. 12, 2013 issued in Application No. PCT/KR2012/008720.
Korean Notice of Allowance dated Aug. 27, 2013 issued in Application No. 10-2011-0109225.
Chinese Search Report dated Feb. 15, 2016 issued in Application No. 2012800576547.

* cited by examiner

REGENERATIVE AIR-CONDITIONING APPARATUS

CROSS-REFERENCE TO RELATED PATENT APPLICATIONS

This application is a U.S. National Stage Application under 35 U.S.C. §371 of PCT Application No. PCT/KR2012/008720, filed Oct. 23, 2012, which claims priority to Korean Patent Application No. 10-2011-0109225, filed Oct. 25, 2011.

TECHNICAL FIELD

The present disclosure relate to a regenerative air-conditioning apparatus.

BACKGROUND ART

Regenerative air-conditioning apparatuses may perform a cooling cycle for cooling an indoor space or a heating cycle for heating the indoor space through processes for compressing, condensing, expanding and evaporating a refrigerant using a compressor including an outdoor unit and an indoor unit, an outdoor heat exchanger, an expansion valve, and an indoor heat exchanger.

Such a regenerative air-conditioning apparatus includes a heat accumulation unit between an outdoor unit and an indoor unit. In the heat accumulation unit, the inside of a case is filled with a heat storage medium, and a heat accumulation tube is disposed between the heat storage medium. A refrigerant within the heat accumulation tube may be heat-exchanged with the heat storage medium.

According to the regenerative air-conditioning apparatus, cool air or heat may be stored in the heat storage medium while the refrigerant flows between the outdoor unit and the heat accumulation unit. Thus, cool air or heat may be stored in the heat accumulation unit while the outdoor unit is operated using inexpensive midnight electricity, and then, an indoor space may be cooled or heated by using the cool air or heat stored in the heat accumulation unit. Also, the outdoor unit may be operated to cool or heat the indoor space while using the cool air or heat stored in the heat accumulation unit.

When the cooling operation or the heating operation is performed, the refrigerant flowing into the outdoor unit and the indoor unit may flow in directions different from each other. Thus, when the cool air or heat is stored in the heat accumulation unit, or the indoor space is cooled or heated using the cool air or heat stored in the heat accumulation unit, the refrigerant flowing into the heat accumulation tube may flow in directions different from each other.

Thus, tubes for connecting the heat accumulation unit, the outdoor unit, and the indoor unit to each other should be provided, and valves for opening or closing the tubes should be controlled so that a flow direction of the refrigerant flowing into the heat accumulation tube is changed according to an operation state of the regenerative air-conditioning apparatus.

In the related art, tubes for connecting the heat accumulation unit to the outdoor unit and the indoor unit are complicated, and also valves for opening or closing the tubes are provided in plurality. Thus, manufacturing costs may be increased, and an operation of controlling the valves may be complicated.

DISCLOSURE OF INVENTION

Technical Problem

Embodiments provide a regenerative air-conditioning apparatus including a heat accumulation unit in which a valve and tube are simplified in arrangement.

Solution to Problem

In one embodiment, a regenerative air-conditioning apparatus includes: an outdoor unit including a compressor and an outdoor heat exchanger; an indoor unit disposed on a side of the outdoor unit, the indoor unit including an indoor heat exchanger; a refrigerant tube connecting the outdoor unit to the indoor unit to guide circulation of a refrigerant; a heat accumulation bath disposed on at least one side of the outdoor unit and the indoor unit to store cool air or heat; a first tube extending from the refrigerant tube to one side of the heat accumulation bath; a second tube extending from the other side of the heat accumulation bath to the refrigerant tube; and a third tube branched from the second tube, the third tube being connected to the refrigerant tube.

In another embodiment, a regenerative air-conditioning apparatus includes: an outdoor unit including a compressor and an outdoor heat exchanger; an indoor unit disposed on a side of the outdoor unit, the indoor unit including an indoor heat exchanger; a flow switching valve disposed in the outdoor unit to switch a flow of a refrigerant; a first refrigerant tube extending from one side of the outdoor heat exchanger to one side of the indoor heat exchanger; at least one expansion valve disposed in the first refrigerant tube; a second refrigerant tube extending from the flow switching valve to the outdoor heat exchanger or the indoor heat exchanger; a heat accumulation bath disposed on at least one side of the outdoor unit and the indoor unit to receive a heat storage medium; a plurality of tubes connecting the heat accumulation bath to the first refrigerant tube; and a second tube connecting the heat accumulation bath to the second refrigerant tube.

Advantageous Effects of Invention

According to the embodiment, the number of valve included in the heat accumulation unit may be relatively less, and the tube system may be simplified to reduce manufacturing costs and simplify the control.

Also, since an opened degree of each of the plurality of valves is adjusted to guide the refrigerant flow, the cool air accumulation operation, the heat accumulation operation, and the cooling/heating operation may be easily switched.

MODE FOR THE INVENTION

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
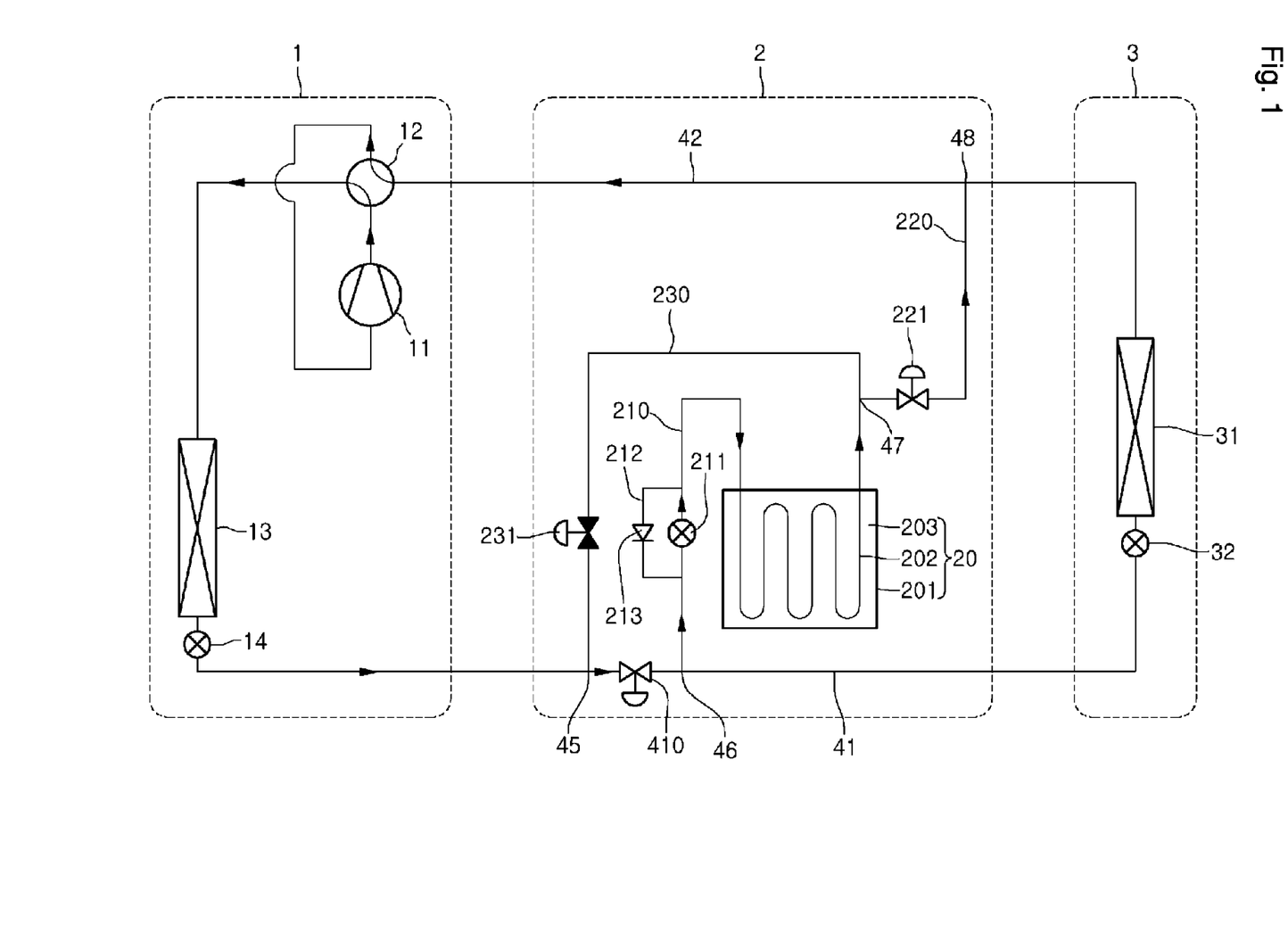
FIG. 1 is a view illustrating a refrigerant flow in a cool air accumulation operation according to an embodiment.
Figure 2:
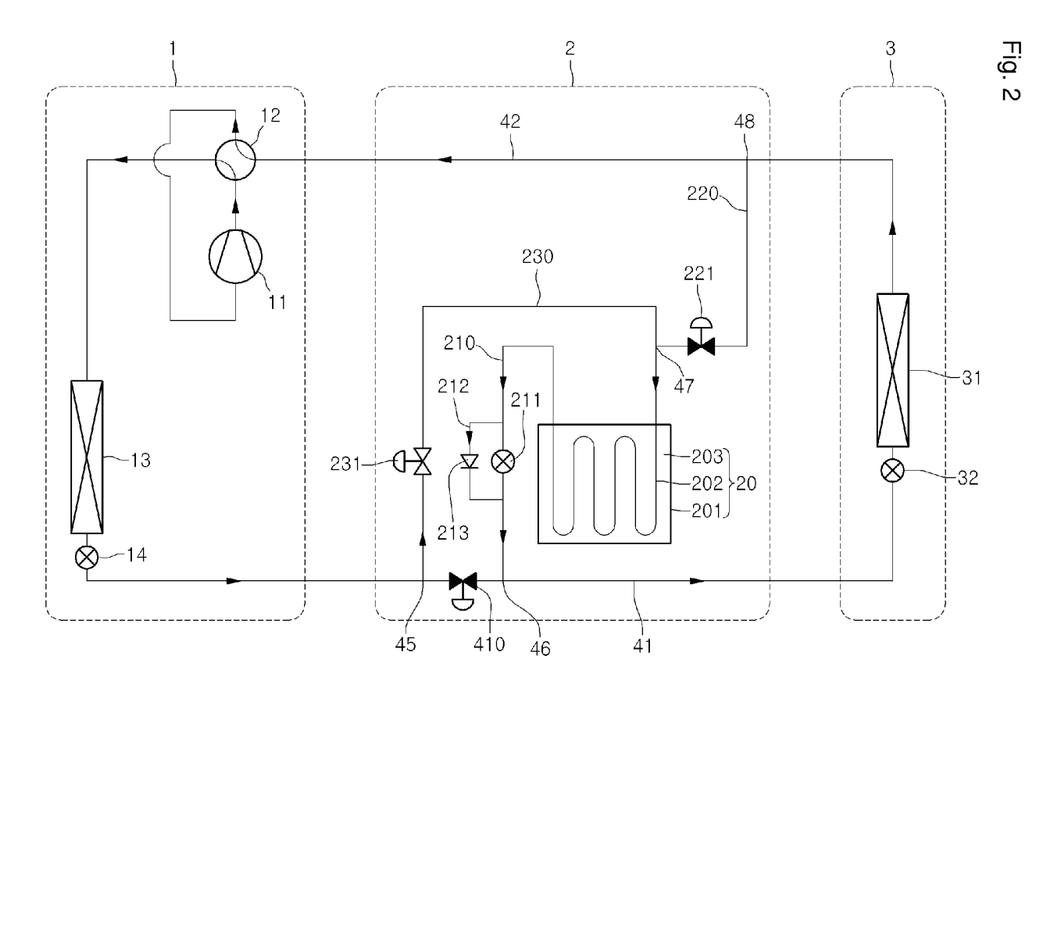
FIG. 2 is a view illustrating a refrigerant flow in a cool air dissipation cooling operation according to an embodiment.
Figure 3:
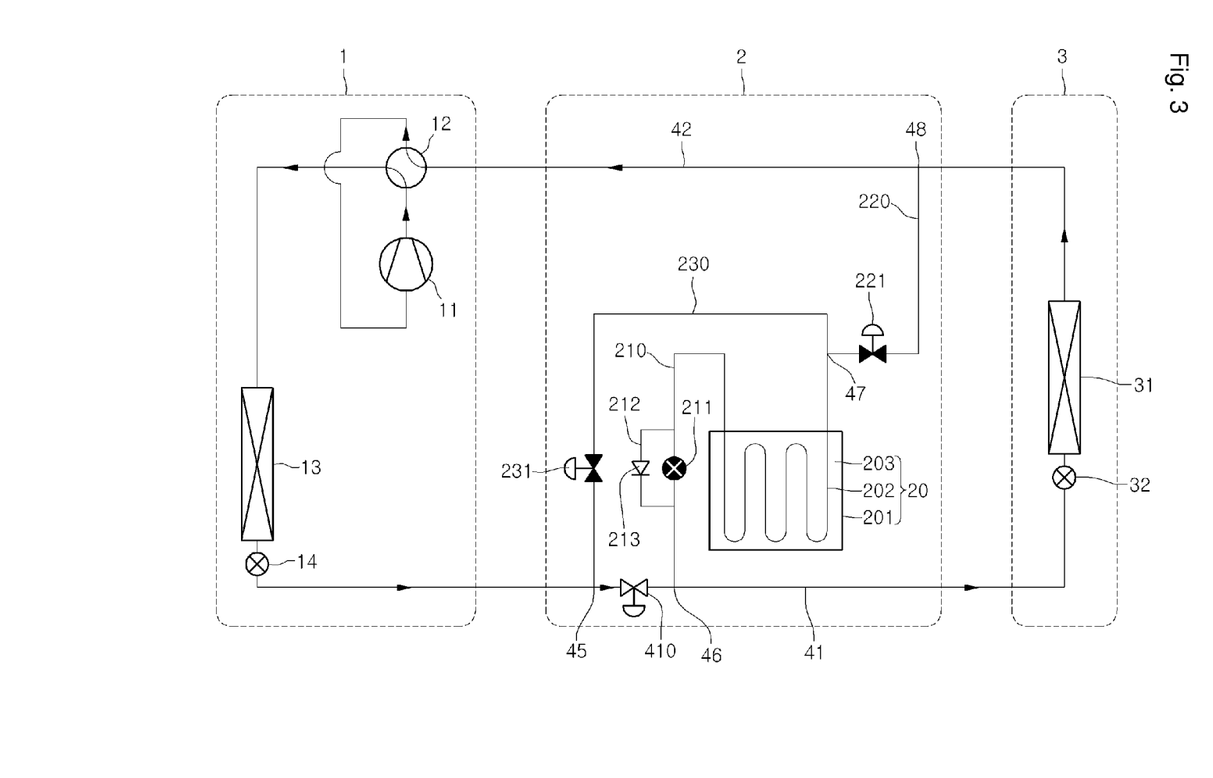
FIG. 3 is a view illustrating a refrigerant flow in a cooling operation according to an embodiment.

FIG. 1 is a view illustrating a refrigerant flow in a cool air accumulation operation in a regenerative air-conditioning apparatus according to an embodiment. FIG. 2 is a view illustrating a refrigerant flow in a cool air dissipation cooling operation. FIG. 3 is a view illustrating a refrigerant flow in a cooling operation.

Referring to FIG. 1, a regenerative air-conditioning apparatus according to an embodiment includes an outdoor unit 1, a heat accumulation unit 2, and an indoor unit 3.

A compressor 11 compressing a refrigerant flowing into the outdoor unit 1 includes a flow switching valve 12 for switching a flow direction of the refrigerant discharged from the compressor 11, an outdoor heat exchanger 13 in which the refrigerant flowing into a tube is heat-exchanged with outdoor air, and an outdoor expansion valve 14 in which the refrigerant discharged from the outdoor heat exchanger 13 is expanded.

The outdoor heat exchanger 13 has one side connected to the flow switching valve 12 and the other side connected to one side of the indoor heat exchanger 31 by a first connection tube 41. The outdoor expansion valve 14 and an indoor expansion valve 32 are disposed in the first connection tube 41.

The indoor unit 3 includes the indoor heat exchanger 31 in which the refrigerant flowing into the pipe is heat-exchanged with indoor air and the indoor expansion valve 32. Also, the indoor heat exchanger 31 has the other side connected to the flow switching valve 12 by a second connection tube 42. That is to say, the second connection tube 42 extends from the flow switching valve 12 to the outdoor heat exchanger 13 or the indoor heat exchanger 31.

The heat accumulation unit 2 includes a heat accumulation bath 20 for storing heat or cool air. The heat accumulation bath 20 includes a case 201 defining an outer appearance thereof, a heat accumulation tube 202 disposed within the case to allow the refrigerant to flow therethrough, and a heat storage medium 203 filled into the case 201.

The heat accumulation tube 202 may be bent several times within the case 201. Thus, an area on which the refrigerant flowing into the heat accumulation tube 202 is heat-exchanged with the heat storage medium 203 may be significantly increased.

The heat storage medium 203 may be heat-exchanged with the refrigerant flowing into the heat accumulation tube 202 to store the cool air or heat. For example, water may be used as the heat storage medium 203.

When the refrigerant flowing into the heat accumulation tube 202 has a low temperature, the heat storage medium 203 may be cooled at a low temperature or phase-shifted into an ice to store cool air while being heat-exchanged with the refrigerant. Also, when the refrigerant flowing into the heat accumulation tube 202 has a high temperature, the heat storage medium 203 may be heated at a high temperature or phase-shifted into vapor to store heat while being heat-exchanged with the refrigerant.

The heat accumulation tube 202 has one side connected to a second connection part 46 of the first connection tube 41 by a first tube 210 and the other side connected to a third connection part 48 of the second connection tube 42 by a second tube 220. Also, a third tube 230 is branched from a branch part 47 of the second tube 220 and connected to the first connection tube 41. In summary, the first tube 210 and the third tube 230 connect the heat accumulation bath 20 to the first connection tube 41, and the second tube 220 connects the heat accumulation bath 20 to the second connection tube 42.

An expansion member 211 for expanding the flowing refrigerant is disposed in the first tube 210. Also, a bypass tube 212 for allowing the flowing refrigerant to bypass the expansion member 211 is connected to the first tube 210. A check valve 213 for allowing the refrigerant to flow in one direction is disposed in the bypass tube 212.

A second valve 221 for opening or closing the second tube 220 is disposed in the second tube 220. Also, the branch part 47 is disposed between a point at which the heat accumulation tube 202 is connected to the second tube 220 and a point at which the second valve 221 is disposed.

That is, the second tube 220 has one side connected to the heat accumulation bath 20 and the other side connected to the third connection part 48. The branch part 47 is disposed between the one side and the other side of the second tube 220. The second valve 221 is disposed between the branch part 47 and the third connection part 48.

A third valve 231 for opening or closing a flow of the refrigerant flowing into the third tube 230 is disposed in the third tube 230.

Also, a point 45 (a first connection part) at which the third tube 230 is connected to the first connection tube 41 is disposed relatively close to the outdoor heat exchanger 13 than a point 46 (a second connection part) at which the first tube 210 is connected to the first connection tube 41.

That is, the first connection part 45 and the second connection part 46 are disposed in the first connection tube 41. A first valve 410 for controlling a flow of the refrigerant is disposed on a point between the first connection part 45 and the second connection part 46 of the first connection tube 41. Also, the first tube 210 extends from the second connection part 46 to the heat accumulation bath 20, and the third tube 230 extends from the first connection part 45 to the heat accumulation bath 20.

Hereinafter, a flow of the refrigerant in the cool air accumulation operation will be described simply. The cool air accumulation operation may be understood as an operation for storing a predetermined heat source in the heat accumulation bath 20.

When the cool air accumulation operation is performed, a refrigerant is compressed into a high-temperature high-pressure gas by the compressor 11 and is discharged. Then, the gas refrigerant passes through the flow switching valve 12 and is introduced into the outdoor heat exchanger 13. The refrigerant is condensed in the outdoor heat exchanger 13 while being heat-exchanged with outdoor air, and thus is phase-shifted into a high-temperature high-pressure liquid state. The refrigerant discharged from the outdoor heat exchanger 13 may become in a liquid state or a two-phase refrigerant state in which liquid and gas are mixed with each other while passing through the outdoor expansion valve 14.

Also, the first valve 410 and the second valve 221 are opened, and the third valve 231 is closed. Thus, the refrigerant passing through the outdoor expansion valve 14 is decompressed while passing through the expansion member 211 disposed in the first tube 210. The low-temperature refrigerant passing through the expansion member 211 is heat-exchanged with the heat storage medium 203 while passing through the heat accumulation tube 202. Then, the refrigerant is evaporated while passing through the heat accumulation tube 202 to cool the heat storage medium 203.

Also, since the third valve 231 is closed, the refrigerant passing through the heat accumulation tube 202 flows into the flow switching valve 12 through the second tube 220 and the second connection tube 42. The introduced refrigerant may flow toward an inlet of the compressor 11 by the flow switching valve 12.

A refrigerant flow in the cool air dissipation cooling operation will be described with reference to FIG. 2. The cool air dissipation cooling operation may be understood as a process for performing a cooling operation by using (dissipating) the heat source stored in the heat accumulation bath 20.

When the cool air dissipation cooling operation is performed, a refrigerant is compressed into a high-temperature high-pressure gas by the compressor 11 and is discharged. Then, the high-temperature high-pressure gas refrigerant passes through the flow switching valve 12 and is introduced into the outdoor heat exchanger 13. The refrigerant is condensed while being heat-exchanged with the outdoor air in the outdoor heat exchanger 13. Also, the refrigerant discharged from the outdoor heat exchanger 13 may become in a liquid state or a two-phase refrigerant state in which liquid and gas are mixed with each other while passing through the outdoor expansion valve 14.

Then, the first valve 140, the second valve 221, and the expansion member 211 of the heat accumulation unit 2 are controlled to block a flow of the refrigerant. Thus, the refrigerant passing through the outdoor expansion valve 14 flows into the third tube 230 and the second tube 220 and then is introduced into the heat accumulation bath 20. The refrigerant introduced into the heat accumulation bath 20 is heat-exchanged with the heat storage medium 203 while flowing into the heat accumulation bath 202. Here, the refrigerant may have a relatively high temperature than that of the heat storage medium 203. Thus, the refrigerant flowing into the heat accumulation tube 202 is heat-exchanged with the heat storage medium 203, and thus is decreased in temperature.

The refrigerant passing through the heat accumulation tube 202 flows into the first tube 210, the bypass tube 212, and the first connection tube 41 and then flows into the indoor unit 3. The refrigerant introduced into the indoor unit 3 is expanded by the indoor expansion valve 32, and then is evaporated in the indoor heat exchanger 31. The refrigerant absorbs heat of the indoor air while being evaporated to decrease a temperature of the indoor air. The low-temperature low-pressure gas refrigerant evaporated in the indoor heat exchanger 31 flows into the second connection tube 42. Then, the refrigerant passes through the flow switching valve 12 and is introduced into the compressor 11.

A refrigerant flow in the cooling operation will be described with reference to FIG. 3.

When the cooling operation is performed, a refrigerant is compressed into a high-temperature high-pressure gas by the compressor 11 and is discharged. Then, the high-temperature high-pressure gas refrigerant passes through the flow switching valve 12 and is introduced into the outdoor heat exchanger 13. The refrigerant is condensed while being heat-exchanged with the outdoor air in the outdoor heat exchanger 13.

Then, the second valve 221 and third valve 231 of the heat accumulation unit 2 are controlled to block a flow of the refrigerant. Since the refrigerant flow is blocked in the second tube 220 and the third tube 230, a flow of the refrigerant from the first connection tube 41 into the first tube 210 is blocked. In addition, the expansion member 211 may be controlled to block the refrigerant flow. Thus, the refrigerant passing through the outdoor expansion valve 14 flows into the first connection tube 41 and is introduced into the indoor unit 3.

The refrigerant introduced into the indoor unit 3 is expanded by the indoor expansion valve 32, and then is evaporated in the indoor heat exchanger 31. The refrigerant absorbs heat of the indoor air while being evaporated to decrease a temperature of the indoor air. The low-temperature low-pressure gas refrigerant evaporated in the indoor heat exchanger 31 flows into the second connection tube 42. Then, the refrigerant passes through the flow switching valve 12 and is introduced into the compressor 11.

Figure 4:
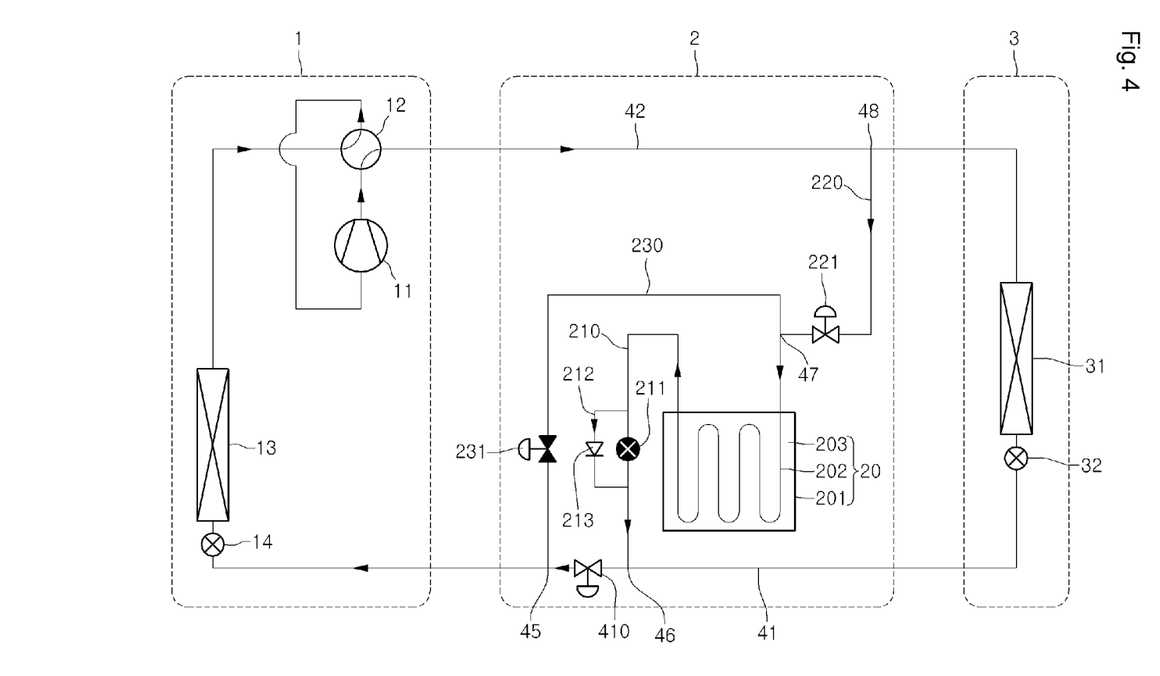
FIG. 4 is a view illustrating a refrigerant flow in a heat accumulation operation according to an embodiment.
Figure 5:
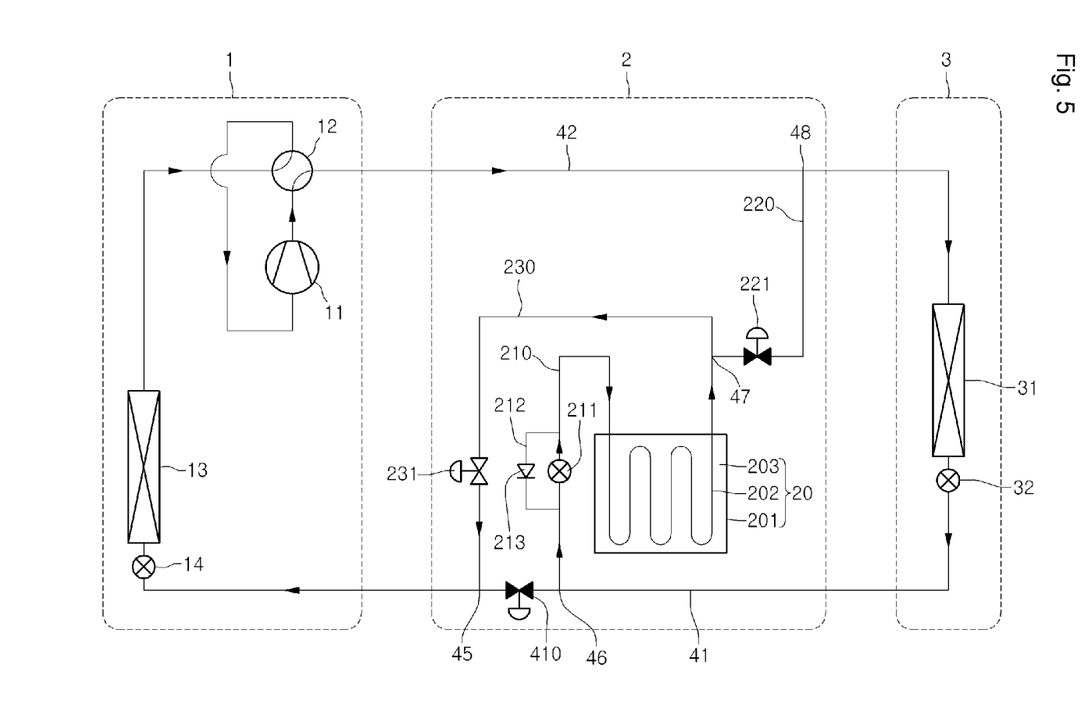
FIG. 5 is a view illustrating a refrigerant flow in a heat dissipation heating operation according to an embodiment.
Figure 6:
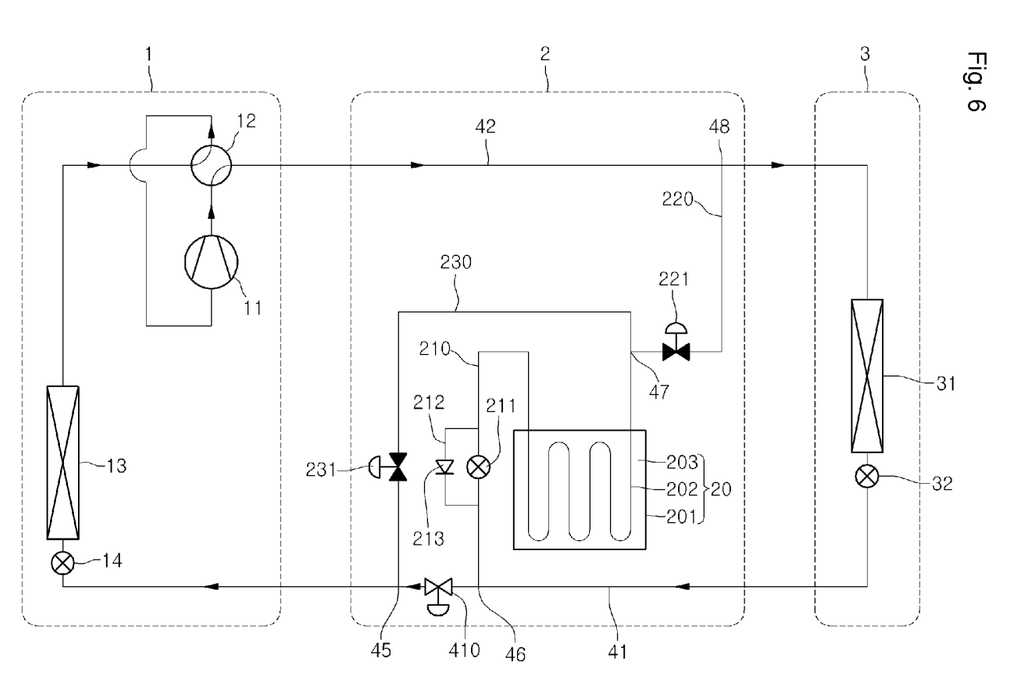
FIG. 6 is a view illustrating a heating operation according to an embodiment.

FIG. 4 is a view illustrating a refrigerant flow in a heat accumulation operation in the regenerative air-conditioning apparatus according to an embodiment. FIG. 5 is a view illustrating a refrigerant flow in a heat dissipation heating operation. FIG. 6 is a view illustrating a refrigerant flow in a heating operation.

The heat accumulation operation will be described with reference to FIG. 4. When the heat accumulation operation is performed, a refrigerant is compressed into a high-temperature high-pressure gas by the compressor 11 and is discharged. Then, the gas refrigerant passes through the flow switching valve 12 to flow into the second connection tube 42.

Then, the third valve 211, the expansion member 211, and the indoor expansion valve 32 are controlled to block a flow of the refrigerant. Thus, the refrigerant compressed into the high-temperature high-pressure gas by the compressor 11 flows into the second tube 220 and is introduced into the heat accumulation bath 20. The refrigerant introduced into the heat accumulation bath 20 is heat-exchanged with the heat storage medium 203 and condensed while flowing into the heat accumulation bath 202. That is, the heat storage medium 203 absorbs heat from the high-temperature high-pressure gas refrigerant.

Since the expansion member 211 is closed, the refrigerant passing through the heat accumulation bath 20 flows into the first tube 210, the bypass tube 212, the first valve 410, and the first connection tube 41 and then is introduced into the outdoor expansion valve 14.

The refrigerant condensed in the heat accumulation bath 20 is expanded by the outdoor expansion valve 14, and then is heat-exchanged with outdoor air in the outdoor heat exchanger 13. In this process, the refrigerant is evaporated into a low-temperature low-pressure gas refrigerant. The low-temperature low-pressure gas refrigerant passes through the flow switching valve 12 and then is introduced into the compressor 11.

A refrigerant flow in the heat dissipation heating operation will be described with reference to FIG. 5. The heat dissipation heating operation may be understood as a process for performing a heating operation by using (dissipating) the heat source stored in the heat accumulation bath 20.

When the heat dissipation heating operation is performed, a refrigerant is compressed into a high-temperature high-pressure gas by the compressor 11 and is discharged. Then, the gas refrigerant passes through the flow switching valve 12 to flow into the second connection tube 42.

Then, the first valve 410 and the second valve 221 are controlled to block a flow of the refrigerant. Thus, the refrigerant compressed into the high-temperature high-pressure gas by the compressor 11 flows into the second tube 42 and is introduced into the indoor unit 3.

The refrigerant introduced into the indoor unit 3 is condensed while being heat-exchanged with the indoor air in the indoor heat exchanger 31. That is, the high-temperature high-pressure gas refrigerant is condensed into a liquid refrigerant while heat within the refrigerant is transmitted into the outdoor air. The condensed refrigerant is expanded by the indoor expansion valve 32 to flow into the heat accumulation unit 2.

Since the first valve 410 is closed, the refrigerant flows into the first tube 210 and is decompressed by the expansion member 211. The refrigerant having a temperature decreased while passing through the expansion member 211 receives heat from the heat storage medium 203 while flowing into the heat accumulation tube 202.

Since second valve 221 is closed, the refrigerant passing through the heat accumulation bath 20 flows into the third tube 230. Then, the refrigerant passes through the third valve 231 and is introduced into the first connection tube 41. The refrigerant is expanded by the outdoor expansion valve 14 and is evaporated in the outdoor heat exchanger 13. The evaporated gas refrigerant passes through the flow switching valve 12 and is introduced into the compressor 11.

A refrigerant flow in the heating operation will be described with reference to Fig. Figs. en the heating operation is performed, a refrigerant is compressed into a high-temperature high-pressure gas by the compressor 11 and is discharged. Then, the gas refrigerant passes through the flow switching valve 12 to flow into the second connection tube 42.

Then, the second valve 221 and third valve 231 are controlled to block a flow of the refrigerant. Thus, the refrigerant compressed into the high-temperature high-pressure gas by the compressor 11 flows into the second tube 42 and is introduced into the indoor unit 3.

The refrigerant introduced into the indoor unit 3 is condensed while being heat-exchanged with the indoor air in the indoor heat exchanger 31. That is, the high-temperature high-pressure gas refrigerant is condensed into a liquid refrigerant while heat within the refrigerant is transmitted into the indoor air.

Since the refrigerant flow is blocked in the second tube 220 and the third tube 230, a flow of the refrigerant into the first tube 211 is blocked. In addition, the expansion member 211 may be turned off to block the refrigerant flow. Thus, the refrigerant passing through the indoor heat exchanger 31 flows into the first connection tube 41 and is introduced into the indoor unit 1.

The refrigerant introduced into the indoor unit 1 is expanded by the outdoor expansion valve 14. The refrigerant decompressed by the outdoor expansion valve 14 is evaporated in the outdoor heat exchanger 13. Then, the refrigerant passes through the flow switching valve 12 and is introduced into the compressor 11.

The above-described first and second connection tubes 41 and 42 may be called "refrigerant tubes" because the first and second connection tubes 41 and 42 connect the outdoor unit 1 to the indoor unit 3 to guide circulation of the refrigerant. That is, the first connection tube 41 may be called a "first refrigerant tube", and the second connection tube 42 may be called a "second refrigerant tube".

According to the embodiment, the number of valve included in the heat accumulation unit may be relatively less, and the tube system may be simplified to reduce manufacturing costs and simplify the control. Also, since an opened degree of each of the plurality of valves is adjusted to guide the refrigerant flow, the cool air accumulation operation, the heat accumulation operation, and the cooling/heating operation may be easily switched.

INDUSTRIAL APPLICABILITY

According to the embodiment, the number of valve included in the heat accumulation unit may be relatively less, and the tube system may be simplified to reduce manufacturing costs and simplify the control. Thus, industrial applicability may be significantly high.

The invention claimed is:

1. A regenerative air-conditioning apparatus, comprising:
an outdoor device including a compressor and an outdoor heat exchanger;
an indoor device provided on a side of the outdoor device, the indoor device including an indoor heat exchanger;
a flow switching valve provided in the outdoor device to switch a flow of a refrigerant;
a first refrigerant tube that extends from a first side of the outdoor heat exchanger to a first side of the indoor heat exchanger;
at least one expansion valve provided in the first refrigerant tube;
a second refrigerant tube that extends from the flow switching valve to the outdoor heat exchanger or the indoor heat exchanger;
a heat accumulation bath provided on at least one side of the outdoor device or the indoor device to receive a heat storage medium;
a plurality of tubes that connects the heat accumulation bath to the first refrigerant tube; and
a second tube that connects the heat accumulation bath to the second refrigerant tube, wherein the plurality of tubes includes:
a first tube that connects the first refrigerant tube to a first side of the heat accumulation bath; and
a third tube branched from one point of the second tube, the third tube connected to the first refrigerant tube, wherein a first connection part connected to the third tube and a second connection part connected to the first refrigerant tube are provided in the first refrigerant tube, wherein a first valve that controls a refrigerant flow is provided between the first connection part and the second connection part, wherein the first tube extends from the second connection part to the heat accumulation bath, wherein the third tube extends from the first connection part to the second tube, wherein the first connection part is provided between the first valve and the outdoor heat exchanger, wherein the first connection part is provided relatively closer to the outdoor heat exchanger than the second connection part, wherein the regenerative air-conditioning apparatus further includes an expansion member provided in the first tube to decompress the refrigerant, a second valve that opens and closes the second tube, provided in the second tube, a third valve that opens and closes the third tube, provided in the third tube, wherein the first valve and the second valve block a flow of the refrigerant during a heat dissipation heating operation, and wherein the refrigerant passes through the third valve during the heat dissipation heating operation.

2. The regenerative air-conditioning apparatus according to claim 1, further including:

wherein the expansion member decompresses the refrigerant passing through the outdoor heat exchanger during a cool air accumulation operation, and wherein the first valve and second valve are opened during the cool air accumulation operation, and the third valve is closed during the cool air accumulation operation.

3. The regenerative air-conditioning apparatus according to claim 1, wherein the first valve, second valve, and the expansion member block a flow of the refrigerant during a cool air dissipation cooling operation.

4. The regenerative air-conditioning apparatus according to claim 1, wherein the second valve, the third valve, and the expansion member block a flow of the refrigerant during a cooling operation.

5. The regenerative air-conditioning apparatus according to claim 1, further including:

bypass rube provided on a side of the first tube to bypass the expansion member during a heat accumulation operation, wherein the third valve and the expansion member block a flow of the refrigerant during the heat accumulation operation.

6. The regenerative air-conditioning apparatus according to claim 1, wherein the second valve and the third valve block a flow of the refrigerant during a heating operation.

7. The regenerative air-conditioning apparatus according to claim 1, wherein the heat accumulation bath includes:

a case that defines an outer appearance thereof;

a heat accumulation tube provided within the case through which the refrigerant flows; and a heat storage medium provided in the case which heat exchanges with the refrigerant flowing through the heat accumulation tube.

8. The regenerative air-conditioning apparatus according to 7, wherein the heat accumulation tube is bent several times within the case.

9. The regenerative air-conditioning apparatus according to 7, wherein the heat storage medium is water.

10. The regenerative air-conditioning apparatus according to 7, wherein a first side of the heat accumulation tube is connected to the second connection part of the first connection tube by the first tube, and wherein a second side of the heat accumulation tube is connected to a third connection part of the second connection tube by the second tube.

* * * * *